United States Patent [19]

Nicholson et al.

[11] Patent Number: 5,011,175

[45] Date of Patent: Apr. 30, 1991

[54] WHEELCHAIR

[76] Inventors: J. Dudley Nicholson, 9715 Elizabeth Lake Rd.; Stanley Secretan, 9211 Elizabeth Lake Rd., both of Leona Valley, Calif. 93551

[21] Appl. No.: 566,266

[22] Filed: Aug. 13, 1990

Related U.S. Application Data

[63] Continuation of Ser. No. 361,390, Jun. 5, 1989, abandoned.

[51] Int. Cl.[5] .............................................. B62M 1/14

[52] U.S. Cl. ................................ 280/304.1; 280/650; 297/DIG. 4

[58] Field of Search .................. 280/250.1, 304.1, 642, 280/647, 650, 291; 297/DIG. 4, 417, 130

[56] References Cited

U.S. PATENT DOCUMENTS

| | | | |
|---|---|---|---|
| 3,882,949 | 5/1975 | Anderson | 297/DIG. 4 |
| 4,483,653 | 11/1984 | Waite | 280/250.1 |
| 4,613,151 | 9/1986 | Kielczewski | 280/250.1 |

*Primary Examiner*—Charles A. Marmor
*Assistant Examiner*—Mitchell Bompey
*Attorney, Agent, or Firm*—Jack C. Munro

[57] ABSTRACT

A wheelchair that is to be movable between an upper normal sitting position and a lower reclining position. When in the lower position, the seat frame of the wheelchair is located substantially two-thirds nearer the supportive surface when compared to the upper position.

3 Claims, 2 Drawing Sheets

WHEELCHAIR

This is a continuation of application Ser. No. 07/361,390, filed June 5, 1989, now abandoned.

BACKGROUND OF THE INVENTION

The field of this invention relates to a need for people suffering from a physical disability which restricts their mobility and more particularly to a new and novel wheelchair which provides for locomotion of the handicapped individual in a safe manner as well as expanding the sphere of usage of the wheelchair.

The use of wheelchairs have long been known to provide mobility to people that have little or no usage of their legs. The normal wheelchair locates the individual in a normally seated position. This means that the center of gravity of the seated individual is located approximately twenty-five inches above the supportive surface on which the wheelchair is located. This locating of the center of gravity above the supportive surface does not normally present a problem if the wheelchair is located within a house or building and the wheelchair is moved at a slow rate of speed.

In recent years, the wheelchair has become motorized by being powered electrically. This electric powered chair is capable of being operated not only indoors but is also capable of being moved in the outdoor environment. If the wheelchair encounters uneven terrain, because of the high center of gravity, it is easy for the wheelchair to be tipped over. Tipping over of the wheelchair can be very dangerous to the occupant plus without outside help it is practically impossible for the occupant of the chair to right the chair and get back into the chair.

Also, certain individuals may have the need to locate themselves directly adjacent the supportive surface. One example of this would be for a lady that is taking care of a baby. It may be very difficult for that wheelchair bound lady to change the baby's diaper in a conventional wheelchair. However, if the wheelchair is lowered much closer to the supportive surface, that task, that is exceedingly difficult in a conventional wheelchair, can be completed easily.

Further, there is also a need for a wheelchair bound individual to be positioned at a higher than normal sitting position. This higher position provides access to normally unattainable shelves for example.

SUMMARY OF THE INVENTION

The primary objective of the present invention is to construct a wheelchair that is movable between a higher than conventional sitting position to a lowered reclining position.

Another objective of the present invention is to construct a wheelchair to facilitate movement on uneven terrain in a safe manner.

Another objective of the present invention is to construct a wheelchair which can locate the occupant of the wheelchair very near the supportive surface so that the individual is capable of getting into and out of the chair even though the individual may not have any use of his or her legs.

Another objective of the present invention is to construct a wheelchair with fold-down, integrally attached, doorlike armrests on both sides to provide unobstructed ingress and egress from either side of the wheel chair.

The wheelchair of the present invention includes a rear wheel assembly and a front wheel assembly. A seat frame is pivotally mounted to the rear wheel assembly. Also pivotally mounted to the seat frame is a leg rail assembly. Pivotally attached to the outer edge of the leg rail assembly is a footplate. The footplate is connected by a linkage assembly to the seat frame. Movement of the seat frame from the upper position to the lower position causes the leg rail assembly to be pivoted substantially ninety degrees from a vertical position to a substantially horizontal position and at the same time inclines the footplate so that the footplate will assume a more comfortable occupying position during usage in this position. An armrest assembly is mounted in conjunction with the seat frame. This armrest assembly is pivotally mounted between an extended position substantially enclosing the side walls of the seat frame to a retracted position permitting lateral ingress and egress of the occupant in conjunction with the seat frame.

DETAILED DESCRIPTION OF THE SHOWN EMBODIMENT

Figures 1, 2:
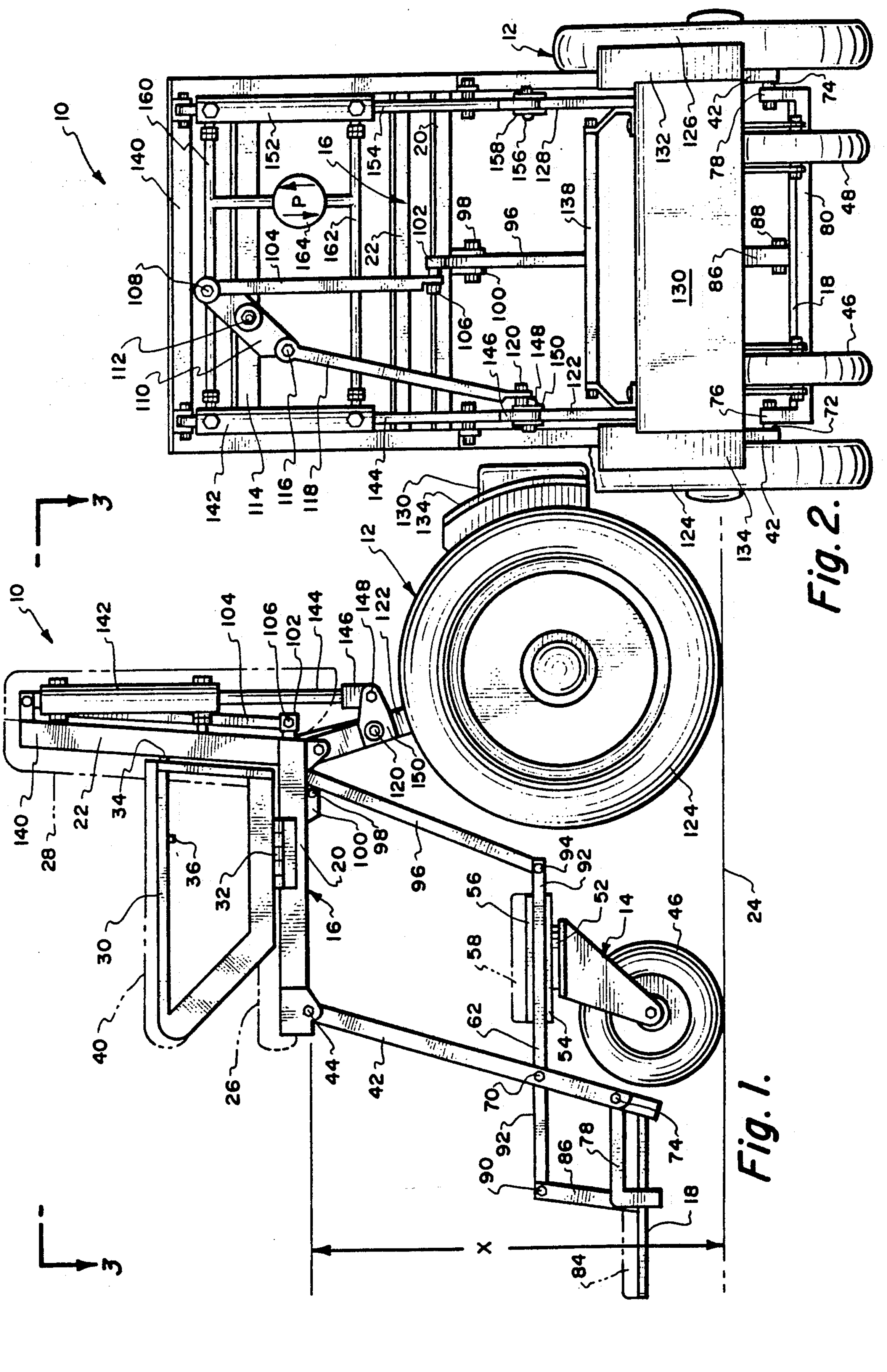
FIG. 1 is a side elevational view of the wheelchair of the present invention showing the wheelchair in the upper position in which the occupant of the chair would assume a typical sitting position.
FIG. 2 is a rear elevational view of the wheelchair of FIG. 1.

Referring particularly to the drawings, there is shown the wheelchair 10 of this invention which is composed generally of a rear wheel assembly 12, a front wheel assembly 14, a seat frame 16, and a footplate 18. The seat frame 16 is composed of sheet metal tubular members forming a seat section 20 and a back section 22. Generally, the seat section 20 is to be positioned substantially horizontal and parallel to the supportive surface 24. Seat section 20 also has a longitudinal, laterally centered, brace 31. Also, the seat section 20 is designed to have mounted thereon a cushiony pad 26. A similar cushiony pad 28 is to be mounted onto the back section 22. The buttocks of the user (not shown) is to be located on the pad 26 with the back area of the user to be placed against the pad 28. The pads 26 and 28 have been removed for purposes of illustration in conjunction with the drawings.

Mounted on each lateral edge of the seat section 20 is a trapezoidal shaped rigid frame 30. It is to be understood that there two in number of the frames 30. Each frame 30 is connected by a separate hinge assembly 32 to the seat section 20. The frame 30 is to be pivotable by the hinge assembly 32 from the extended position shown in solid lines in FIGS. 1, 3 and 4 of the drawings to a retracted position (shown in FIG. 4). This retracted position is when the frame 30 is located approximately one hundred eighty degrees from the position shown in FIG. 1 and is located nearer the supportive surface 24.

When in the extended position, each of the frames 30 form an enclosing side wall for the seat frame 16. It is the function of the frames 30 to provide lateral restraint for the occupant of the seat frame 16 and prevent the occupant from accidentally falling out of the seat frame 16. With the rigid frames 30 in the extended position, such can be locked in place by means of a pin 34 which is mounted within a portion of the frame 30. The pin 34 is to be manually movable by pressing against knob 36. The outer end of the pin 34 is to slide within a hole 38 formed within the back section 22. It is to be understood that there will be a separate hole 38 for each frame 30. With the pin 34 engaged with the hole 38, each frame 30 is locked in position in conjunction with the seat frame 16 It is to be understood that in order to move the frames 30 to the retracted position, it will be necessary to press against the knob 36 and disengage the pin 34 from its respective hole 38.

Generally, it will be necessary to disengage at least one of the frames 30 in order to permit the occupant to become disassociated from the wheelchair 10. Each of the frames 30 function as an armrest when they are in the extended position. Normally, the uppermost portion of the frames 30 will be covered by a cushiony pad 40. These frames 30 will also function as a location to mount the electrical controller (not shown) for propelling, braking, steering and raising and lowering the wheelchair.

Attached to the forward edge of the seat section 20 is leg rail assembly 42. The leg rail assembly 42 is pivotally mounted by bolts 44 to the seat section 20. Leg rail assembly 42, when observed from the front of the wheelchair 10 with the wheelchair in the upper position, is generally rectangular and is formed of tubular bar stock. With the wheelchair 10 in the upper position, the leg rail assembly 42 is basically substantially vertical to the supportive surface 24. With the wheelchair 10 in the lower position shown in FIG. 4, the leg rail assembly 42 is in a substantially horizontal position, that is parallel to the supportive surface 24. Therefore, it is readily apparent that the leg rail assembly 42 is capable of pivoting relative to the seat section 20.

The front wheel assembly 14 includes a pair of wheels 46 and 48. Each of the wheels 46 and 48 are supported by a separate caster bracket 50 with only the caster bracket 50 for wheel 46 being shown. Each caster bracket 50 is individually mounted by a separate bearing assembly 52 to a mounting plate 54. It is to be understood that there is a separate mounting plate 54 for each of the wheels 46 and 48. Each of the plates 54 are fixedly mounted to the undersurface of a baseplate 56. It may be desirable for reasons of comfort to place a cushiony material 58 on the baseplate 56. The reason for the cushiony material 58 is that when the wheelchair 10 is in the lower/reclined position that the cushiony material 58 will contact the rear portion of the legs of the user.

Fixedly attached on the baseplate 56, in a laterally spaced apart arrangement, are a pair of arms 60 and 62. Arm 60 has a right angled extension 64 that is pivotally secured by a bolt 66 to a portion of the leg rail assembly 42. In a similar manner, the arm 62 has a right angled extension 68 that is pivotally mounted by means of a bolt 70 to a portion of the leg rail assembly 42.

It is noted that the bolts 66 and 70 are in alignment with each other and are located the same distance from the supportive surface 24. It is also to be noted that the bolts 66 and 70 are not located at the outer end of the leg rail assembly 42. At the outer end of the leg rail assembly 42 there is pivotally mounted by means of bolts 72 and 74 brackets 76 and 78, respectively. Brackets 76 and 78 are fixedly mounted onto footplate 18. Actually the brackets 76 and 78 are connected together across the undersurface of the footplate 18 by means of a first connecting member 80. It is to be understood that the brackets 76 and 78, as well as first connecting member 80, are all formed of tubular bar stock. The forward end of the brackets 76 and 78 are also connected together by a second connecting member 82. Second connecting member 82 is located parallel to first connecting member 80. The members 80 and 82 function to form a supporting platform for the footplate 18. It may be desirable to mount a cushiony material 84 on the footplate 18 if such is deemed to be desired It is understood that the footplate 18 is to provide a resting and protection area for the feet of the occupant of the wheelchair 10. The cushiony material 84 may be designed to include restraints so the user's feet are held in position on the footplate 18.

The height of footplate 18 is to be adjustable (moved closer and further from seat frame 16) by adding a plurality of spaced apart holes (the hole that connects to bolt 74 is one) in the leg rail assembly 42. This adjustment is so the wheelchair 10 can be used by both long and short legged people. Preferable range of adjustment would be about three inches. As the footplate 18 is adjusted, the bracket 86 would have to be altered accordingly in length.

Pivotally mounted by a bolt 88 on the upper surface of the footplate 18 at its approximate lateral midpoint is a bracket 86. The free or upper end of the bracket 86 is pivotally mounted by means of a bolt 90 to a link 92. The link 92 passes under the baseplate 56 and is fixedly secured thereto and is terminated at a bolt 94. The bolt 94 is pivotally connected to an inner link 96. The upper end of the inner link 96 is pivotally mounted by means of a bolt 98 to a bracket extension 100. The bracket extension 100 is fixedly mounted onto the brace 31.

Integrally attached to the inner link 96 and extending rearwardly therefrom is a short link extension 102. An upper link 104 is pivotally connected by means of a bolt 106 to the short link extension 102. The upper end of the upper link 104 is pivotally connected by means of a bolt 108 to a plate 110. Plate 110 is pivotally mounted by means of a bolt 112 to cross brace 114 of back section 22. The plate 110 is also pivotally connected by means of a bolt 116 to a link 118. The lower end of the link 118 is pivotally mounted by means of bolt 120 to fork arm 122 of the rear wheel assembly 12. The lower end of the fork arm 122 forms the axle for the left rear wheel 124. The right wheel 126 is attached to the lower end of a fork arm 128. Fork arm 128 is in lateral alignment with fork arm 122. The fork arms 122 and 128 are integrally connected together by a cross piece (not shown) which is covered by means of cover 130. Associated with cover 130 are shields 132 and 134 which partially cover the back area of the tires 126 and 124 respectively. The function of the shields 132 and 134 is somewhat similar to the conventional fender for an automobile.

Cover 130 also encloses appropriate gearing mechanism which is not shown in order to drive the wheels 124 and 126. The driving power for the wheels is to be supplied by means of a battery (not shown) mounted within battery casing 136. The battery is to operate electric motors (not shown). Battery casing 136 is located between the wheels 124 and 126 and is supported on appropriate framing interconnecting the fork members 122 and 128. Battery casing 136 is to be removable in order to provide access into the battery compartment (not shown) by means of a handle 138.

Mounted to the backside of upper cross member 140 of the back section 22 is one end of an actuator 142. Actuator 142 includes a movable piston rod 144. The outer end of the movable piston rod 144 is fixedly mounted to a block 146. The block 146 is pivotally mounted by means of a bolt 148 to a bifurcated bracket 150. Bracket 150 is fixedly mounted onto fork arm 122.

In a similar manner, a second actuator 152 is located in parallel alignment to actuator 142 and is attached to cross member 140. The actuator 152 includes a movable piston rod 154 the outer end of which is pivotally mounted by means of bolt 156 to bifurcated bracket 158. Bracket 158 is in turn mounted on the fork arm 128.

The upper end of the fluid chamber (not shown) contained within each of the actuators 142 and 152 are connected together by means of a first connecting tube 160. The lower end of the actuators 142 and 152 are connected together by means of a second connecting tube 162. Connecting together the tubes 160 and 162 is a pump 164. For purposes of description, it is to be stated that the pump 164 is bidirectional and is to be operated in conjunction with a fluid reservoir (not shown). It is considered to be within the scope of this invention that the actuators 142 and 152 may either be hydraulic or pneumatic. It is also considered to be within the scope of this invention that the pump 164 is to be operated by a control mechanism probably mounted in conjunction with one of the armrest frames 30. The operation of the pump 164 will probably be from the battery contained within the battery casing 136.

Figure 3:
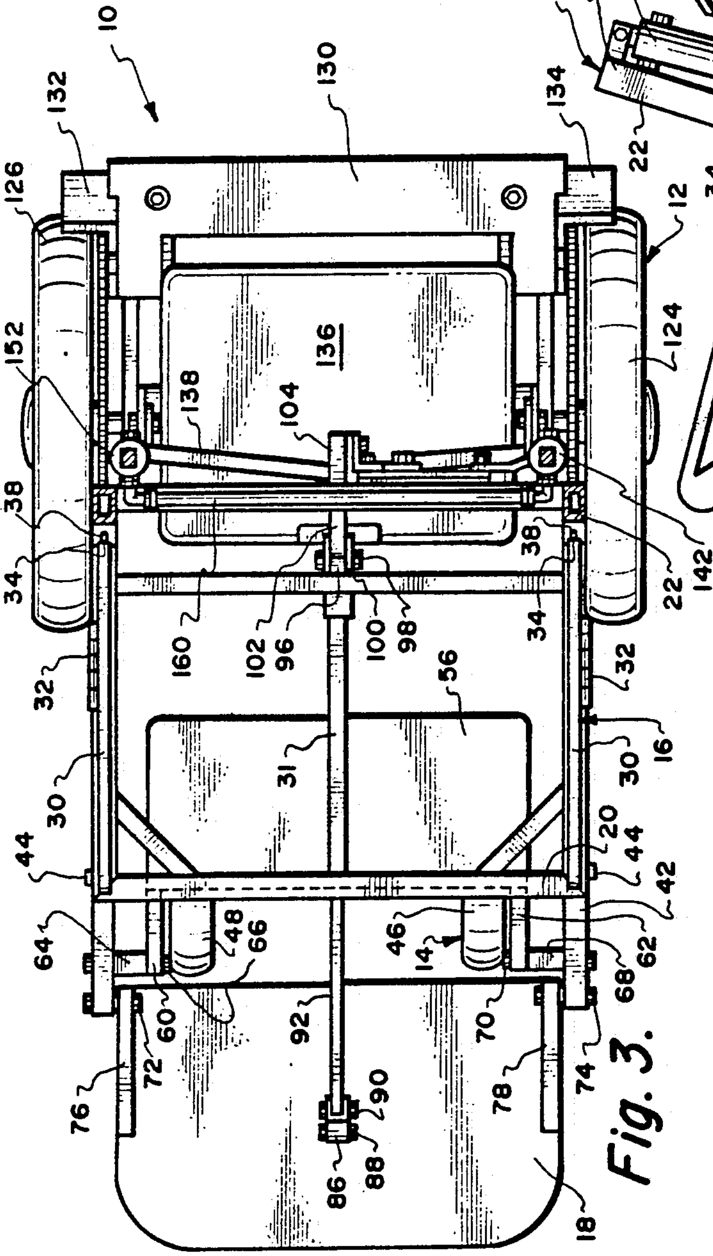
FIG. 3 is a top plan view, partly in cross-section, of the wheelchair of the present invention taken along line 3—3 of FIG. 1.

The operation of the wheelchair 10 of this invention is as follows: Let it initially be assumed that the wheelchair 10 is in the upper position as shown in FIGS. 1 through 3 of the drawings, in this position the bottom edge of the seat frame is located a distance X from the supportive surface 24. A typical distance for distance X would be twenty-two and one-half inches.

Figure 4:
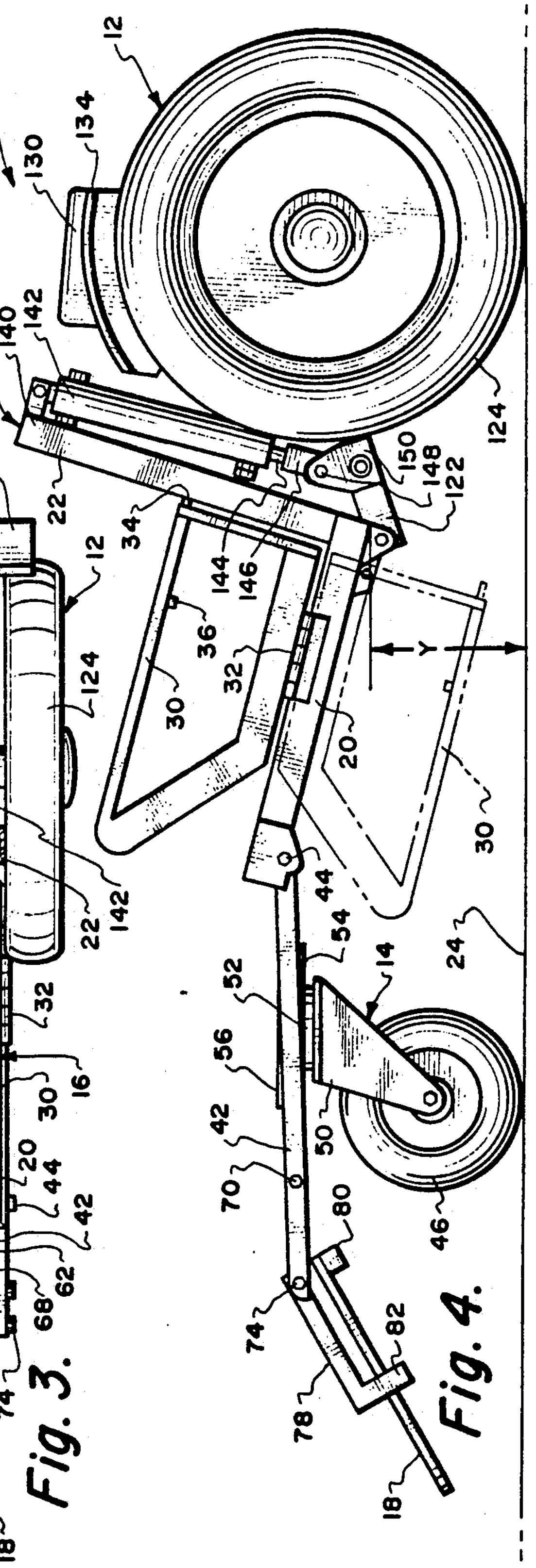
FIG. 4 is a side elevational view of the wheelchair of the present invention showing the wheelchair in the lower position in which the occupant would occupy a reclining position.

Let it now be assumed that the operator wishes to move wheelchair 10 to the lower or reclined position which is shown in FIG. 4 of the drawings. In this particular position the lower edge of the seat frame 16 is located a distance Y from the supportive surface 24 with a typical distance for Y being approximately seven and one-half inches. The operator will activate the pump 164 to cause fluid to be pumped through tube 162 into the lower end of the actuators 142 and 152. The piston rods 144 and 154 are moved into almost total confinement within their housings of the actuators 142 and 152. This causes the fork arms 122 and 128 to pivot counterclockwise as shown in FIG. 1 of the drawings. This counterclockwise movement is almost ninety degrees. As this movement occurs, the leg rail assembly 42 pivots clockwise from an almost vertical position to almost horizontal position, again, almost ninety degrees. At the same time, the plate 110 is pivoted clockwise as shown in FIG. 2 of the drawings which causes extending of the link 104 and a limited amount of clockwise pivoting motion of the link 96. This pivoting motion causes the link 92 to move forwardly which results in the link 86 pivoting clockwise as shown in FIG. 1 of the drawings. The net result is when the wheelchair 10 is in the lower position the footplate 18 assumes moves through an angle below the horizontal to assume an inclined position as depicted in FIG. 4. This inclined position is far more comfortable for the occupant's lower legs than if the footplate 18 was assuming a substantially horizontal position as shown in FIGS. 1 and 3 of the drawings.

It is to be understood that in order to effect movement of the wheelchair 10 back to the upper position that the pump 164 is activated in a reverse manner which causes fluid to flow through connecting tube 160 into the upper end of the actuators 142 and 152 which causes the piston rods 144 and 154, respectively, to be extended which in turn will cause the wheelchair 10 to move from the lower reclined position shown in FIG. 4 to the upper position shown in FIGS. 1 through 3. Pump 164 can be stopped in any position in between the upper and lower positions. This stopping is accomplished by use of a bidirectional relief valve (not shown) in the fluid line connecting directly with the pump 164.

What is claimed is:

1. A wheelchair comprising:

a chair-like frame having a seat section adapted to support a buttocks of a human being, said seat section having longitudinal opposite edges defined as a forward edge and a rearward edge, said seat frame including a back section adapted to support a back of a human being, said back section being fixedly mounted onto said seat section;

a leg rail assembly pivotally mounted to said seat section at said forward edge;

a linkage assembly connected between said leg rail assembly and said seat section at said rearward edge;

a front wheel assembly being mounted on said linkage assembly, said front wheel assembly to continually rest on a supportive surface;

a rear wheel assembly pivotally mounted to said seat section at said rearward edge, said rear wheel assembly to continually rest on the supportive surface;

an actuator assembly connected to both said rear wheel assembly and said linkage assembly, said actuator assembly for causing movement of said seat frame between an upper position and a lower position, said lower position being located substantially nearer the supportive surface than said upper position, with said seat frame in said upper position said front wheel assembly being located nearest said rear wheel assembly with both said front wheel assembly and said rear wheel assembly being located between said seat frame and the supportive surface, with said seat frame in said lower position said front wheel assembly being located furthest from said rear wheel assembly with said seat frame being located substantially between said front wheel assembly and said rear wheel assembly, both said front wheel assembly and said rear wheel assembly being movable relative to each other and movable relative to said seat frame; and a footplate pivotally mounted to the free outer end of both said leg rail assembly and said linkage assembly, during movement of said seat frame from said upper position to said lower position said footplate is simultaneously moved from a substantially horizontally oriented position through an angle below the horizontal to an inclined position.

2. The wheel chair as defined in claim 1 wherein:

with said seat frame in said lower position said seat section being positioned approximately two-thirds nearer the supportive surface than when in said upper position.

3. The wheelchair as defined in claim 1 wherein:

an armrest assembly attached to said seat frame, said armrest assembly being movable between an extended position and a retracted position, with said armrest assembly in said extended position said armrest assembly forming enclosing sidewalls for said seat frame, with said armrest assembly in said retracted position said armrest assembly being located in a spaced position facilitating lateral access into and out of said seat frame.

* * * * *